Patented Oct. 18, 1938

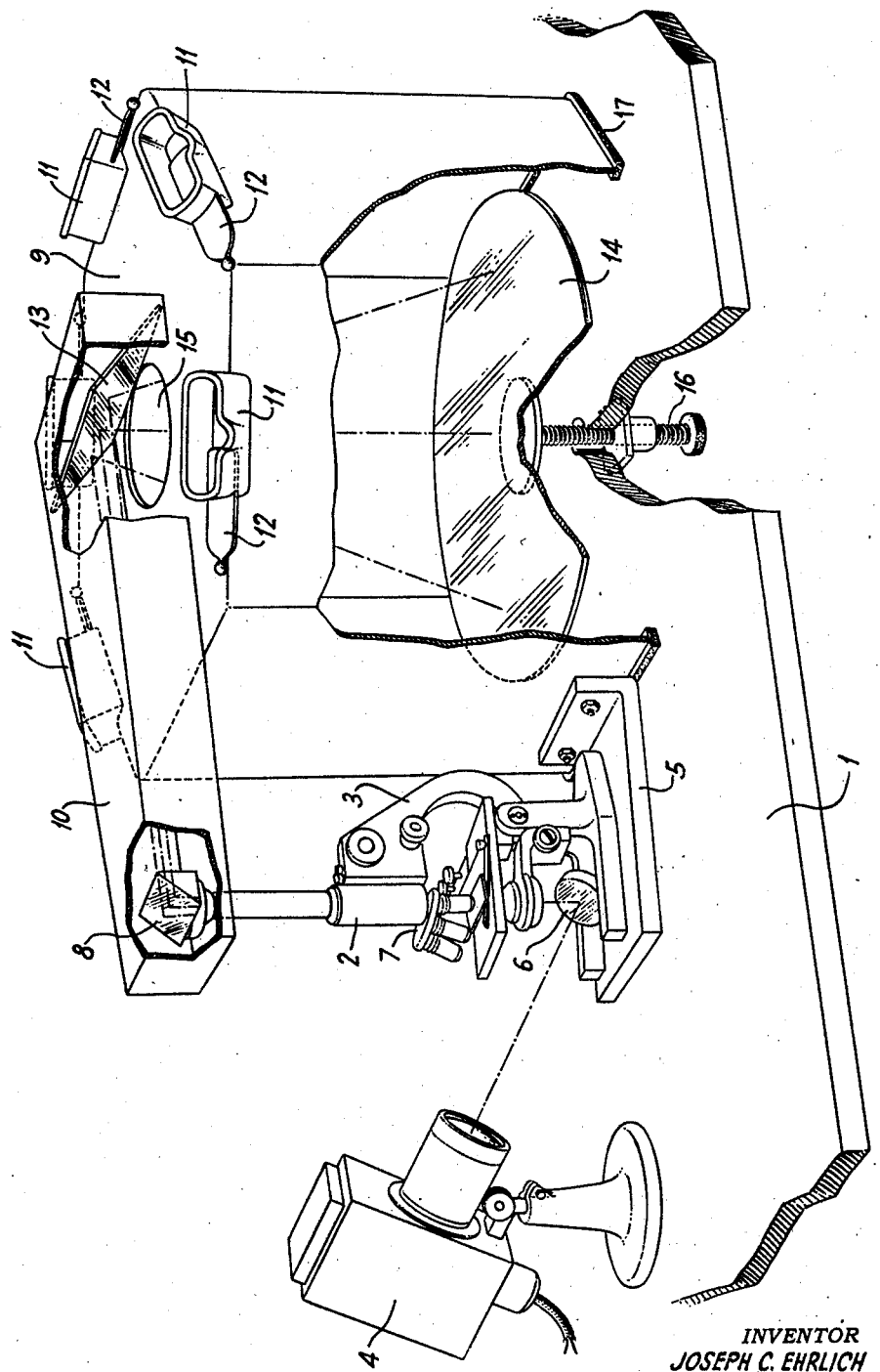

2,133,321

UNITED STATES PATENT OFFICE 2,133,321

MICROPROJECTING APPARATUS

Joseph C. Ehrlich, New York, N. Y.

Application January 30, 1937, Serial No. 123,095

7 Claims. (Cl. 88—24)

The present invention relates to improvements in micro-projectors, and more particularly to such of these as enable a group of persons to view the projected image at the same time.

Heretofore, in using micro-projectors for enabling several persons to view simultaneously an enlarged projected image, it has been necessary to completely darken the room in which such projections were carried out in order to exclude from the screen on which the projected image is thrown, all light other than that coming from the microscope. Such methods of using a micro-projector have entailed the following difficulties: (1) Complete darkening of the room has been difficult or impossible to achieve because even in a completely darkened room, incidental light reaches the screen by reflection of the light of the projection apparatus itself from various objects and surfaces in the room. (2) Since such projection must usually be arranged so that the screen is at a distance of at least several feet from the microscope, the image projected has been a relatively large image. This large image has suffered from poor illumination, particularly with higher magnifications, even when the light source has been a very powerful one. This poor illumination of the image in the higher magnifications could not be relieved by increasing the intensity of the light source because the microscopic preparations are rapidly faded and sometimes destroyed when too intense a light source is employed. (3) The enormous degree of magnification resulting from the projection of such large images has resulted in a loss of the finer detail, in higher magnifications. Thus, for example, projection through an oil immersion lens has been impractical because of poor illumination and poor detail. (4) The necessity for employing a darkened room has made microscopic projection an inconvenient and therefore an only occasionally used procedure. As a result, regular and frequent demonstrations and teaching of microscopic science to classes and groups has been inadequately carried out and high restricted.

The present invention overcomes the foregoing disadvantages, and provides a micro-projector which can give extremely high magnifications in a brightly lit room. In accordance with the invention, the problem has been solved by using a light source of the same intensity as that which has previously been employed, attaining sufficient increase in intensity of illumination and fineness of detail by shortening the distance of the screen from the miscroscope, and of the observer from the screen. At the same time, the entire apparatus has been enclosed in such a way that the use of a darkened room is no longer necessary, and in such a way further that incidental reflected light from the projection apparatus itself is excluded from the screen, the only light falling on the screen being that which passes through the microscope itself and constitutes the projected image.

Further characteristics in the design of the micro-projecting apparatus of the invention have made it possible for a group of persons to be so placed that each member of the group observes the screen from a distance equal to that of each other member of the group. Furthermore, the apparatus of the invention is so designed that even within the limits of the shortened projection distance employed, further changes in this distance by manipulation of the screen, may be carried out in order to produce further variations in light intensity, and in distance of the screen from the observer.

An essential feature of the invention is the dark chamber which produces, preferably, a table top image. This chamber is provided, around its upper edge, with a plurality of sight openings, each sight opening having a opaque slide for preventing light in the room from entering the chamber when the particular opening is not being used. The chamber is so arranged as to enable its quick and simple removal from the microscope, thereby permitting ordinary micro-projection with the well known limitations of such type of projection.

Another feature of the invention lies in the use of an adjustable screen which enables both a variation in the intensity of the light reaching the screen and a variation in the distance of the screen from the observer.

A more detailed description of the invention follows, accompanied by a single drawing.

Referring to the drawing, there is shown mounted on a table 1, any suitable microscope 2 supported by a base piece 3, and provided with an adjustable luminous source 4, preferably an electric lamp. The microscope is provided, as usual, with a lower orientable mirror 6 intended to illuminate the object or slide, and a lens holder 7, the upper part of the apparatus carrying also a prism 8 for projecting the image at a right angle to the axis of the microscope. Also positioned on the flat top of the table is a dark chamber 9 from whose interior the undesired light in the room is excluded and which has at its top portion a horizontally extending and completely enclosed hollow arm 10 whose free end is adapted to fit snugly over the prism, as shown. A fixed platform 5 attached to the chamber provides a resting place on which the microscope 2 may be placed and supplied with light from a suitable source, such as 4.

Chamber 9 is of generally polygonal or circular form to provide, around its upper surface, a plurality of view openings, each of which has a slightly raised hood 11 communicating through the opening with the interior of the chamber for permitting an inspection of the projected image. Chamber 9 is made of any suitable material and is preferably blackened on its interior surface, the chamber preferably resting on a felt padding 17 which is attached to the lower edge thereof. The chamber may be of any desired shape but preferably such as to enable a group of observers to be comfortably seated around the chamber without crowding. Each hood 11 has associated therewith a suitably blackened and opaque slide 12 which is slidable within the hood for closing the opening to the room when the hood is not in use, thereby screening each view opening from light in the room.

Mounted in the interior of the horizontal arm 10 at the end opposite that accommodating the prism, and so placed as not to interfere with the sight openings 11, is a suitable mirror 13 mounted at an angle of approximately 45° whose reflecting surface is arranged to receive the rays of light projected by the prism 8 of the microscope and to reflect same downward through an aperture 15 in the chamber onto a screen 14. In one embodiment used in practice, the mirror 13 was made of glass silvered on its front surface, i. e., the surface nearest the light source, for preventing any possible absorption of light in passing through the glass, although it will be appreciated that any suitable reflecting surface may be employed. The screen 14 can be raised or lowered by a suitable mechanism such as a screw arrangement 16 to bring the projected image closer to or farther away from the view openings 11 with the proportional changes in the intensity of illumination on the screen. It is to be understood, of course, that where the screen 14 is raised or lowered, suitable focusing adjustments must be made at the microscope. It should be noted, however, that the apparatus is so constructed that adjustment of the position of screen 14 does not permit light from the room to enter the chamber. Although the screen is herein shown as being of circular form, it may be of any suitable shape, provided it is of such size as to accommodate the projected image.

The chamber is designed to be of light weight, and easily portable, so that it may be quickly removed from the microscope merely by lifting it from the table. The chamber is very simple in construction, and may be very economically manufactured, and has been found to be very useful, especially in laboratories and hospitals, although not limited thereto, since it can be used wherever it is desirable to instruct students.

It will be understood, of course, that the invention is not limited to the precise arrangement of parts shown since various modifications may be made without departing from the spirit and scope of the appended claims. For example, where desired the screen 14 may be dispensed with (with its concomitant advantages) and the image projected onto the table top.

What is claimed is:

1. Micro-projecting apparatus including a dark chamber of very generally circular shape, an arm communicating with the interior of said chamber and adapted to form a passageway for the light rays from a microscope to the exclusion of all other light, a mirror in said arm arranged to receive the rays of light from said microscope and to project the rays downward through an aperture in said chamber to form an image on a horizontal surface, said chamber having a plurality of individual view openings equally spaced from said image.

2. Micro-projecting apparatus including a dark chamber of polygonal shape, a hollow, horizontally extending enclosed arm communicating at one end with the interior of said chamber and adapted near its other end to accommodate the prism of a microscope, a mirror near said one end of said arm arranged to receive the rays of light from said prism and to project same downward to form an image on a horizontal surface within said chamber, said chamber having a plurality of individual view openings symmetrically positioned around the upper periphery thereof for enabling a plurality of observers to observe said image, said view openings being equally spaced from said image, and opaque means for screening each view opening from light externally of said chamber when the view opening is not being used.

3. Micro-projecting apparatus including a dark chamber of polygonal shape, a hollow, horizontally extending enclosed arm communicating at one end with the interior of said chamber and adapted near its other end to accommodate the prism of a microscope, a mirror near said one end of said arm arranged to receive the rays of light from said prism and to project same downward to form an image on a horizontal surface within said chamber, said chamber having a plurality of individual view openings around the upper periphery thereof for enabling a plurality of observers to observe said image, said view openings being equally spaced from said image, means for screening each view opening from light externally of said chamber when the view opening is not being used, and means for raising and lowering said horizontal surface.

4. Micro-projecting apparatus including a dark chamber of polygonal shape, a hollow horizontally extending enclosed arm communicating at one end with the interior of said chamber and adapted near its other end to accommodate the prism of a microscope, a mirror at said one end of said arm arranged to receive the rays of light from said prism and to project same downward to form an image on a horizontal surface within said chamber, said mirror being at an angle of substantially 45° and comprising glass which is silvered at its surface nearest the image, said chamber having a plurality of individual view openings symmetrically positioned around the upper periphery thereof for enabling a plurality of observers to observe said image, said view openings being equally spaced from said image, and opaque means for screening each view opening from light externally of said chamber when the view opening is not being used.

5. Micro-projecting apparatus including a dark chamber of very generally circular shape, an arm communicating with the interior of said chamber and adapted to form a passageway for the light rays from a microscope to the exclusion of all other light, and a mirror in said arm arranged to receive the rays of light from said microscope and to project the rays at an angle to form an image on a flat surface within said chamber, said chamber having a plurality of individual view openings symmetrically positioned around it for observing said image, said view openings being equally spaced from said image.

6. Micro-projecting apparatus including a dark chamber of very generally circular shape, a stationary, enclosed, hollow arm communicating with the interior of said chamber through the top of said chamber and adapted to form a passageway for the light rays from a microscope to the exclusion of all other light, a mirror in said arm arranged to project the light rays downward to form an image on a horizontally positioned screen within said chamber, and means for raising and lowering said screen independently of said chamber.

7. Micro-projecting apparatus including a dark chamber of very generally circular shape, an arm communicating with the interior of said chamber and adapted to form a passageway for the light rays from a microscope to the exclusion of all other light, a mirror in the upper part of said arm arranged to receive the rays of light from said arm and to project the rays at an angle through an aperture in said chamber to form an image on a flat surface within said chamber, the area of said aperture being smaller than that of said mirror, said chamber having a plurality of individual view openings symmetrically positioned around it for observing said image, and a viewing hood for each opening.

JOSEPH C. EHRLICH.